United States Patent
Pinto Ferreira et al.

(10) Patent No.: US 10,627,790 B2
(45) Date of Patent: Apr. 21, 2020

(54) SOUS VIDE COOKING

(71) Applicant: Mellow Inc., Walnut, CA (US)

(72) Inventors: José Guilherme Mendonça Vilela Pinto Ferreira, Lisbon (PT); Ana Catarina Violante Vieira, Obidos (PT)

(*) Notice: Subject to any disclaimer, the term of this patent is extended or adjusted under 35 U.S.C. 154(b) by 263 days.

(21) Appl. No.: 14/964,111

(22) Filed: Dec. 9, 2015

(65) Prior Publication Data
US 2016/0081372 A1 Mar. 24, 2016

Related U.S. Application Data

(63) Continuation-in-part of application No. 14/248,476, filed on Apr. 9, 2014, now abandoned.

(51) Int. Cl.
| | |
|---|---|
| *A21B 1/26* | (2006.01) |
| *G05B 15/02* | (2006.01) |
| *A47J 27/04* | (2006.01) |
| *A47J 27/10* | (2006.01) |
| *A23L 5/10* | (2016.01) |
| *A47J 36/32* | (2006.01) |

(52) U.S. Cl.
CPC ............. *G05B 15/02* (2013.01); *A23L 5/13* (2016.08); *A23L 5/17* (2016.08); *A47J 27/04* (2013.01); *A47J 27/10* (2013.01); *A47J 36/321* (2018.08); *A23V 2002/00* (2013.01)

(58) Field of Classification Search
CPC ............. A01B 12/006; A23L 1/0121; G06F 17/30386; A23V 2002/00
See application file for complete search history.

(56) References Cited

U.S. PATENT DOCUMENTS

| | | | | |
|---|---|---|---|---|
| 3,769,028 A * | 10/1973 | Katz | ....................... | A23L 3/001 426/232 |
| 5,281,426 A * | 1/1994 | Pardo | ....................... | A23L 3/10 426/232 |
| 6,730,890 B2 | 5/2004 | Kish | | |
| 6,832,487 B1 * | 12/2004 | Baker | ................. | B67D 1/0868 222/146.6 |
| 7,594,582 B2 * | 9/2009 | Sus | ......................... | A47J 27/18 220/9.4 |
| 7,707,931 B2 * | 5/2010 | Garrett | ................... | A22C 18/00 422/292 |
| 7,757,601 B2 * | 7/2010 | Lagares Corominas | | .................... A23L 5/13 165/61 |
| 8,268,376 B2 * | 9/2012 | Sus | ......................... | A47J 27/18 426/112 |
| 8,684,600 B2 * | 4/2014 | Sus | ......................... | A47J 27/18 220/9.4 |

(Continued)

FOREIGN PATENT DOCUMENTS

| | | |
|---|---|---|
| EP | 2363048 A1 | 9/2011 |
| WO | 2014/019018 A1 | 2/2014 |

*Primary Examiner* — Steven N Leff

(57) ABSTRACT

A method for "sous-vide" cooking includes receiving food type, food quantity, cook begin time, and cook finish time parameters and looking up a default time-temperature pair in a cooking services database. When the default time-temperature pair is suitable for yielding a cooked food meeting the food type, food quantity, cook begin time, and cook finish time parameters, a cooking control routine is derived from the default time-temperature pair. Subsequently, a cooking process may be performed in accordance with the cooking control routine.

20 Claims, 8 Drawing Sheets

(56) References Cited

U.S. PATENT DOCUMENTS

| | | |
|---|---|---|
| 2007/0253647 A1 | 11/2007 | Sus |
| 2008/0066624 A1* | 3/2008 | Taylor ............... A47J 27/10 |
| | | 99/330 |
| 2008/0121636 A1* | 5/2008 | Hallgren ............ H05B 6/6455 |
| | | 219/708 |
| 2008/0220134 A1* | 9/2008 | Cohn .................. A47J 36/16 |
| | | 426/395 |
| 2010/0034935 A1 | 2/2010 | Wally et al. |
| 2011/0185915 A1* | 8/2011 | Eades ................. A47J 27/004 |
| | | 99/331 |
| 2012/0137898 A1* | 6/2012 | Alipour ................. F24J 3/00 |
| | | 99/483 |
| 2012/0251695 A1* | 10/2012 | Neff .................. A47J 27/004 |
| | | 426/509 |
| 2013/0220143 A1 | 8/2013 | Fetterman et al. |
| 2013/0264333 A1 | 10/2013 | Alipour et al. |

\* cited by examiner

SOUS VIDE COOKING

TECHNICAL FIELD

The present disclosure relates generally to cooking and, more particularly, to "sous-vide" cooking as well as methods, processes and procedures related thereto.

BACKGROUND

Cooking and enjoying food are popular pastimes. In both domestic and professional settings, "sous-vide" cooking is becoming increasingly common. In "sous-vide" cooking, food is cooked for relatively longer times at relatively lower temperatures, and is generally separated from a cooking medium by packaging in airtight plastic bags. The cooking medium is usually a temperature-controlled water bath or steam oven which allows for rapid heat transfer between the packaged food and the cooking medium.

In general, "sous-vide" cooking requires that cooking temperatures and durations be controlled precisely to obtain a desired end result, namely, a palatable cooked food that is safe from food-borne bacteria. A user might want to use a non-standard time and temperature combination, for example, to accommodate a set schedule or a lack of time. Moreover, the user might want to modify a well-known time and temperature combination to make an affordance for his or her personal taste. However, deviating from well-known time and temperature combinations can result in food that is not safe or palatable. As a result, conventional methods for "sous-vide" cooking are prone to delays and errors and may cause fears over food safety.

For illustration purposes, in an example situation where a user wishes to cook steak "sous-vide" for his or her dinner, the user may refer to a recipe book or search online for a "sous-vide" recipe. The "sous-vide" recipe may specify, for example, that steak be cooked for approximately two to three hours at 57 degrees Centigrade (57° C.). If the user has only one hour, her or she may wish to adjust the "sous-vide" recipe as per his or her current requirement.

Traditionally, the user has had two options. As a first option, the user may have chosen to delay his or her steak dinner. As a second option, the user may have chosen to arbitrarily modify the "sous-vide" recipe ad hoc, for example, to one hour at 59 degrees Centigrade (59° C.) The first option is inconvenient to the user and the second option risks the cooked steak being unpalatable, unsafe or both.

SUMMARY

In one aspect, a method for "sous-vide" cooking is disclosed. Various cooking parameters including one or more of: food type, food quantity, degree of cook, cook begin time, and cook finish time parameters are received. A default time-temperature pair is looked up in a cooking services database.

When the default time-temperature pair is suitable for yielding a cooked food meeting the food type, food quantity, cook begin time, and cook finish time parameters, a cooking control routine is derived from the default time-temperature pair and a cooking process is performed in accordance with the cooking control routine.

Optionally, the method further includes providing the default time-temperature pair to a client interface.

Optionally, the method further includes transmitting the cooking control routine to a cooking control module arranged to regulate conditions of a cooking chamber.

Optionally, the method further includes adjusting the default time-temperature pair in accordance with the food quantity parameter, wherein the food quantity parameter is measured by a scale of a cooking device.

Optionally, the method further includes producing a new time-temperature pair when the default time-temperature pair is not suitable and assessing whether the new time-temperature pair represents an unacceptable deviation from one or more time-temperature pairs known to yield a palatable and safely cooked food.

Optionally, the method further includes iteratively executing the producing and assessing actions while the new time-temperature pair represents an unacceptable deviation from the one or more time-temperature pairs known to yield a palatable and safely cooked food.

Optionally, the method further includes concluding the iterative executing after a number of iterations equal to a predetermined limit number.

Optionally, the method further including, after a number of iterations equal to a predetermined limit number, providing a notification to a client interface reflecting a failure to establish an acceptable new time-temperature pair.

In another aspect, a method for food treatment is disclosed. Various cooking parameters including one or more of: food type, food quantity, degree of cook, cook begin time, and cook finish time parameters are received from a client interface. The food type and food quantity parameters are employed to look up the default time-temperature correlated to the food type and food quantity parameters in a cooking services database.

When the default time-temperature pair is not capable of yielding a cooked food meeting the food type, food quantity, cook begin time and cook finish time parameters, a new time-temperature pair is produced. When the new time-temperature pair is capable of yielding a cooked food meeting the various cooking parameters, a cooking control routine is derived from the new time-temperature pair.

The cooking control routine is transmitted to a cooking control module of the cooking device. Thereafter, a cooking process is performed in accordance with the cooking control routine.

Optionally, the method further includes employing the food type and food quantity parameters to select a maximum palatable temperature from the cooking services database, determining whether the new time-temperature pair necessitates exceeding the maximum palatable temperature and repeating the producing action when the new time-temperature pair necessitates exceeding the maximum palatable temperature.

Optionally, the method further includes repeating the producing action when the new time-temperature pair is not capable of yielding a cooked food meeting the degree of cook parameter.

Optionally, the method further includes adjusting the default time-temperature pair in accordance with parameters of the cooking device.

Optionally, producing the new time-temperature pair further includes applying an adaptation rule from the cooking services database.

Optionally, the adaptation rule is influenced by a heat equation approximation for the food type and food quantity parameters.

Optionally, the adaptation rule is influenced by pathogen decay curves.

Optionally, the method further includes receiving cooking feedback from the client interface and modifying the default time-temperature pair in accordance with the cooking feedback.

Optionally, the method further includes providing the new time-temperature pair to a client interface.

Optionally, performing the cooking process further includes, activating a cooling module of the cooking device in accordance with the cooking control routine.

Optionally, performing the cooking process further includes, activating a heating module of the cooking device in accordance with the cooking control routine.

Optionally, the method further includes, in accordance with the cooking control routine, employing the cooking control module to control agitation and/or circulation of a cooking medium held by a cooking chamber of the cooking device in accordance with the cooking control routine.

Optionally, activating a cooling module of the cooking device further includes controlling heat flux through the cooling module to a heat sink.

Optionally, employing the cooking control module to control agitation and/or circulation of a cooking medium further includes controlling an amount of air injected into the cooking medium.

Optionally, employing the cooking control module to control agitation and/or circulation of a cooking medium further includes energizing an air pump to supply air through a one-way valve in fluid communication with a cooking medium held by the cooking chamber.

Optionally, performing the cooking process further includes, alternately activating a cooling module of the cooking device and activating a heating module of the cooking device in order to adjust temperature of a cooking medium held by the cooking chamber.

Optionally, employing the cooking control module to control agitation and/or circulation of a cooking medium further includes controlling aeration of the cooking medium.

In yet another aspect, a method for food treatment is disclosed. The method includes, in response to detecting changes in mass and/or force by a plurality of load cells, with a cooking control module, recording the changes in mass and/or force as a food quantity parameter and sending a cooking instructions prompt to a remote client interface; receiving input from the remote client interface regarding food type, degree of cook, cook begin time, and cook finish time parameters; employing the food type and food quantity parameters to look up, in a cooking services database, a default time-temperature pair correlated to the food type and food quantity parameters; producing a new time-temperature pair when the default time-temperature pair is not capable of yielding a cooked food meeting the food type, food quantity, cook begin time and cook finish time parameters; deriving a cooking control routine from the new time-temperature pair; transmitting the cooking control routine to a cooking control module of a cooking device; and performing a cooking process in accordance with the cooking control routine.

Optionally, the method further includes employing the food type and food quantity parameters to select a maximum palatable temperature from the cooking services database determining whether the new time-temperature pair necessitates exceeding the maximum palatable temperature and repeating the producing action when the new time-temperature pair necessitates exceeding the maximum palatable temperature.

Optionally, the method further includes repeating the producing action when the new time-temperature pair is not capable of yielding a cooked food meeting the degree of cook parameter.

Optionally, the method as further includes adjusting the default time-temperature pair in accordance with parameters of the cooking device.

Optionally, the method further includes producing the new time-temperature pair further by applying an adaptation rule from the cooking services database.

Optionally, the method further includes receiving cooking feedback from the client interface and modifying the default time-temperature pair in accordance with the cooking feedback.

Optionally, the method further includes providing the new time-temperature pair to a client interface.

DESCRIPTION OF THE DRAWINGS

The disclosure is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those having skill in the art will understand that the drawings are not to scale. Wherever possible, like elements have been indicated by identical numbers.

Embodiments of the present disclosure will now be described, by way of example only, with reference to the following diagrams wherein.

Figure 1:
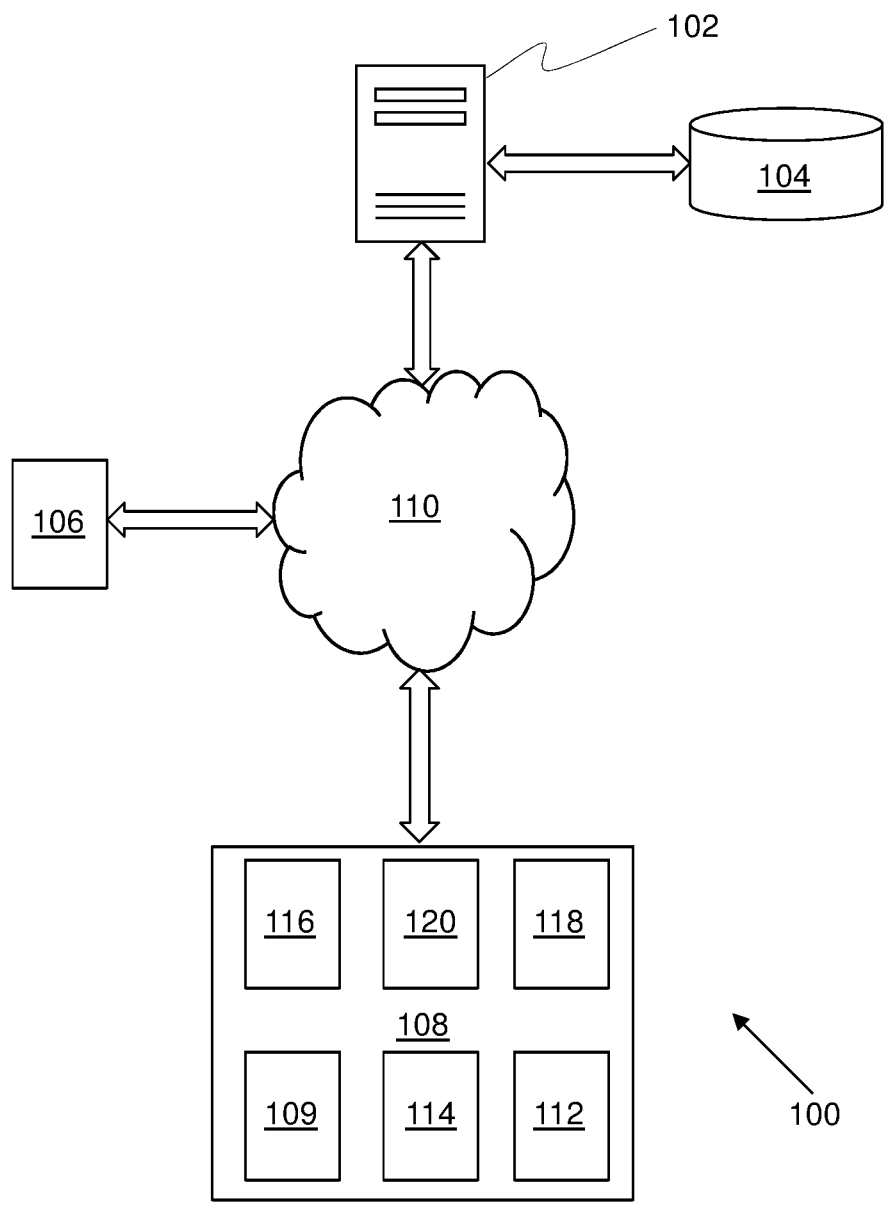
FIG. 1 illustrates a schematic of a cooking system suitable for implementing a method for "sous-vide" cooking, in accordance with embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

Embodiments of the present disclosure substantially eliminate or at least partially address problems in the prior art; and facilitate personalization of a time-temperature pair for easy and safe "sous-vide" cooking of food.

Additional aspects, advantages, features and objects of the present disclosure would be made apparent from the drawings and the detailed description of the illustrative embodiments construed in conjunction with the appended claims.

The following detailed description illustrates embodiments of the present disclosure and ways in which they can be implemented. Although the best mode of carrying out the present embodiments has been disclosed, those skilled in the art will recognize that other embodiments for carrying out or practicing the present disclosure are also possible. It will be appreciated that features of the present disclosure are susceptible to being combined in various arrangements without departing from the scope of the present disclosure as defined by the appended claims.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

A method for "sous-vide" cooking includes receiving various cooking parameters including one or more of: food type, food quantity, degree of cook, cook begin time, and cook finish time. One or more of the various cooking parameters may be received from a client interface or from a cooking device. In an example, the food quantity parameter is measured by a scale of the cooking device.

The food type and food quantity parameters are employed to look up a default time-temperature pair correlated to the food type and food quantity parameters in the cooking services database.

Subsequently, a cook duration is determined from the cook begin time and cook finish time parameters and the time of the default time-temperature pair is compared to the duration.

When the time of the default time-temperature pair is less than or equal to the duration, the time of the default time-temperature pair is suitable for yielding a cooked food meeting the food type, food quantity, cook begin time, and cook finish time parameters. Thus, a cooking control routine is derived from the default time-temperature pair and the default time-temperature pair may be provided to a client interface.

When the time of the default time-temperature pair is greater than the duration, the default time-temperature pair is not suitable and a new time-temperature pair is produced (hereinafter referred to as a producing action). In order to produce the new time-temperature pair, the default time-temperature pair may be adjusted in accordance with the food quantity parameter. Furthermore, the default time-temperature pair may be adjusted in accordance with cooking device parameters of the cooking device.

Moreover, the producing action may include applying an adaptation rule from the cooking services database. In an example, the adaptation rule may be influenced by a heat equation approximation for the food type and food quantity parameters. In another example, the adaptation rule may be influenced by pathogen decay curves.

An assessment is made as to whether the new time-temperature pair represents an unacceptable deviation from one or more time-temperature pairs known to yield a palatable and safely cooked food (hereinafter referred to as an assessing action). In an example, the producing and assessing actions may be iteratively executed while the new time-temperature pair represents an unacceptable deviation from the one or more time-temperature pairs known to yield a palatable and safely cooked food.

If the iterative execution of the producing and assessing actions fails to establish an acceptable new time-temperature pair, the iterative execution may conclude after a number of iterations equal to a predetermined limit number. When iterative execution concludes in this way, a notification may be provided to the client interface reflecting a failure to establish a new time-temperature pair that is acceptable.

In an example, the food type and food quantity parameters are employed to select a maximum palatable temperature from the cooking services database. In another example, it may be determined whether the new time-temperature pair necessitates exceeding the maximum palatable temperature. When the new time-temperature pair necessitates exceeding the maximum palatable temperature, the producing action may be repeated.

Also, the producing action may be repeated when the new time-temperature pair is determined to be incapable of yielding a cooked food meeting the degree of cook parameter.

Finally, when the new time-temperature pair is determined to be capable of yielding a cooked food meeting the various cooking parameters, the cooking control routine is derived from the new time-temperature pair. This cooking control routine as well as the new time-temperature pair may be provided to a client interface.

The cooking control routine may also be transmitted to a cooking control module of the cooking device. The cooking control module is arranged to regulate conditions of a cooking chamber of the cooking device, including but not limited to refrigeration, cooking, and circulation of the cooking chamber as well as combinations of these.

A cooking process may then be performed in accordance with the cooking control routine. During the cooking process, the cooking control module may activate a cooling module or a heating module of the cooking device to decrease or increase temperature of the cooking chamber in accordance with the cooking control routine. The cooking control module may also control agitation and/or circulation of a cooking medium such as a cooking fluid filled in the cooking chamber in accordance with the cooking control routine.

In an example, cooking feedback may be received from the client interface. The default time-temperature pair may then be modified in accordance with the cooking feedback, and updated in the cooking services database.

Referring now to the drawings, particularly by their reference numbers, FIG. 1 illustrates a schematic of a cooking system 100 suitable for implementing a method for "sous-vide" cooking, in accordance with embodiments of the present disclosure. Cooking system 100 includes a server 102, a cooking services database 104, a user device 106, and a cooking device 108. FIG. 1 shows one cooking device and one user device for illustration purposes only. It is to be noted here that the cooking system 100 can be implemented with any number of cooking devices and user devices.

The cooking system 100 may be implemented in various ways, depending on various possible scenarios. In one example, the cooking system 100 may be implemented by way of a spatially collocated arrangement of the server 102 and the cooking services database 104, as shown in FIG. 1. In another example, the cooking system 100 may be implemented by way of a spatially distributed arrangement of the server 102 and the cooking services database 104 coupled mutually in communication via a communication network. In yet another example, the server 102 and the cooking services database 104 may be implemented via cloud-based computing services.

The server 102 is operatively coupled to the user device 106 and the cooking device 108, via a communication network 110.

The communication network 110 can be a collection of individual networks, interconnected with each other and functioning as a single large network. Such individual networks may be wired, wireless, or a combination thereof.

Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, satellite-based telecommunication networks, and Worldwide Interoperability for Microwave Access (WiMAX) networks.

Moreover, the cooking device 108 includes a cooking control module 112. A network interface 114 is coupled with the cooking control module 112 and is configured for communication through the communication network 110.

In order to control cooking device 108 and/or access various services provided by the server 102, user device 106 may employ software or a computer program product that provides a remote client interface to a user of the cooking device 108. The computer program product may be a native application, an application running on a browser, or a plug-in application provided by a website, such as a social networking website. Optionally, the remote client interface may be implemented by way of an interactive Graphical User Interface (GUI).

User device 106 may be implemented using a computing device including computing hardware operable to execute the aforementioned program product. Examples of such computing devices include, but are not limited to, mobile phones, smart telephones, Mobile Internet Devices (MIDs), tablet computers, Ultra-Mobile Personal Computers (UM-PCs), phablet computers, Personal Digital Assistants (PDAs), web pads, Personal Computers (PCs), handheld PCs, laptop computers, desktop computers, large-sized touch screens with embedded PCs, and other interactive devices, such as Television (TV) sets and Set-Top Boxes (STBs).

Moreover, the server 102 may be formulated to provide cooking services, through the communication network 110 and the network interface 114, to the cooking control module 112 and the remote client interface.

The cooking services database 104 may be configured to provide, to the server 102, a variety of information and instructions employable to set a cooking chamber circulation and temperature using the cooking control module 112. The cooking services database 104 may be configured to store past actions and preferences of the user that may be indicative of a personal taste of that user, for example, user feedback.

Moreover, the cooking services database 104 may additionally store one or more cooking device parameters of the cooking device 108, for example, thermal characteristics of the cooking device 108. These thermal characteristics may include at least one of:

(i) a minimum temperature that can be set, namely, a minimum refrigeration temperature;

(ii) a maximum temperature that can be set, namely, a maximum cooking temperature; and/or (iii) a heat capacity of the cooking device 108.

In an example, the server 102 may receive cooking device parameters from the cooking device 108. In this regard, the maximum and minimum temperatures and the heat capacity of the cooking device 108 may be established by default from, for example, its make, model number, serial number or a combination of these. Additionally or alternatively, the server 102 may be operable to estimate the heat capacity of the cooking device 108 from an analysis of past records of time taken to heat up or cool down a cooking chamber of the cooking device 108. With the ability to store one or more cooking device parameters, system 100 is usable with a variety of cooking devices.

Moreover, the cooking services database 104 optionally stores time-temperature pairs known to yield palatable and safely cooked food of various types. These time-temperature pairs may be predetermined and aggregated by the server 102, for example, based on past experiences and preferences of various users.

Furthermore, the cooking device 108 includes a cooling module 116 for decreasing temperature of the cooking chamber of the cooking device 108, and a heating module 118 for increasing temperature of the cooking chamber. The cooking device 108 may further include a scale 120 for measuring a quantity of food.

In an illustrative example, the cooking device 108 is installed at a residence of a user. When the user places a cooking subject, namely, food to be cooked, into a flexible vessel and places the flexible vessel inside the cooking chamber of the cooking device 108, the cooking control module 112 may be operable to send a signal to the server 102 based on a change in mass detected by a scale 120 of the cooking device 108. The server 102 may be operable to then provide a notification such as a cooking instructions prompt to the remote client interface of the user device 106, for example, to ask the user whether he or she wishes to implement a cooking process or input food type, cook begin time and cook end time parameters. In an example, the scale 120 may be comprised of a plurality of load cells.

If the user confirms that he or she wishes to cook, the server 102 may be operable to request that the user provide one or more cooking parameters. These cooking parameters may, for example, include one or more of: food type, food quantity, degree of cook, cook begin time, and/or cook finish time parameters. However, cooking parameters usable with disclosed methods are not limited to these.

The food type parameter may correspond to a type of food to be cooked, for example, such as vegetables, fruits, seafood, fish, poultry, or meat. The food type parameter may include more detailed or more specific information about the type of food to be cooked. Some examples of the food type include, but are not limited to, beef short ribs, fillet steak, asparagus, chicken, egg and so on. Additionally, the food type parameter may include information regarding the provenance of the cooking subject, for example, fresh, frozen, organic, raw, canned and so on.

The food quantity parameter optionally corresponds to a quantity of food to be cooked, namely, a mass, weight and/or size of the cooking subject. In an example, the food quantity parameter specifies a thickness of the cooking subject and/or a number of portions of the cooking subject. In some examples, the food quantity parameter may be measured by the scale 120 of the cooking device 108, and provided to the server 102.

The degree of cook parameter may correspond to an extent of doneness to which the user wishes the cooking subject to be cooked. In an example, the extent of doneness to which the user wishes a piece of meat be cooked may include gradations, such as medium rare, medium, medium well, well done and so on.

The cook begin time parameter may correspond to a time and/or date when the user wishes a cooking process to be started, while the cook finish time parameter may correspond to a time and/or date by when he/she wishes the cooking process to be finished.

In an example, when the user specifies that the cooked food be ready in two hours, the server 102 takes a current time as a cook begin time, and establishes two hours from the current time as a cook finish time. In another example, when the user specifies that the cooked food be ready in two hours by 8 PM, the server 102 takes 8 PM as the cook finish time, and derives a cook begin time of 6 PM from the 2 hour duration and 8 PM finish time. In another example, when the user specifies that the cooked food be ready by 8 PM, the server 102 subtracts the time of specification of the user, for example 6 PM, from 8 PM to obtain a cook duration.

It is to be noted here that the cooking system 100 is operable to allow the user to provide the cooking parameters remotely via the remote client interface, for example, when he or she is far away from his or her residence.

In some examples, cooking parameters such as degree of cook may be provided by selecting from a plurality of pre-set cooking recipes and/or previous cooking preferences.

Moreover, in some examples, the cooking system 100 may be operable to allow the user to provide the cooking parameters in a natural language. For example, the server 102 may be operable to interpret the cooking parameters using natural language processing techniques.

In an example, the user may provide "fillet steak, medium rare, ready at dinner time" as an input for the cooking parameters. In this example, the type of food is fillet steak, the degree of cook is medium rare, and the cook finish time is a default dinner time which may have been previously set by the user as default. In this example, the food quantity can be measured by the scale 120 of the cooking device 108.

It is to be noted here that the cook begin time need not necessarily be provided by a user. In the above example, the cook begin time is not specified. When the cook begin time parameter is not specified, cooking system 100 may record a time stamp at the time other parameters are specified or at the time load cells of scale 120 detect a change in mass and/or force. The recorded time stamp may then be used as an initial cook begin time parameter to establish cook duration. Accordingly, any suitable time-temperature pair can be produced for the provided cooking parameters.

In another implementation of the cooking system 100, the cooking device 108 includes a local client interface allowing the user to provide the cooking parameters locally to the cooking device 108. Thus, throughout the present disclosure, the term "client interface" may refer to the remote client interface of the user device 106 or the local client interface of the cooking device 108.

Upon receiving cooking parameters from the client interface, the server 102 is operable to look up or retrieve a default time-temperature pair from the cooking services database 104. For this purpose, the server 102 may employ the food type and food quantity parameters to look up a default time-temperature pair correlated to the food type and food quantity parameters.

The server 102 is operable to then determine whether the default time-temperature pair is suitable for yielding a cooked food meeting one or more of the various cooking parameters. For example, the server 102 may compare the time of the default time-temperature pair with the cook finish time and either the cook start time, if specified, or the time at which the cooking parameters were input from the client interface. In some examples, the server 102, the user device or both are capable of stamping parameters input by the user with a timestamp. The cook begin time may then be compared by the server 102 to the timestamp to confirm the cook begin time is later than the timestamp. When the cook begin time is before the timestamp, the server 102 may conclude the process after presenting a notification to the user interface, such as, "Cook begin time has already passed." The server 102 is operable to derive a cooking control routine from the default time-temperature pair, when the default time-temperature pair is suitable. Additionally, the server 102 may be operable to present the default time-temperature pair to the client interface.

Otherwise, when the default time-temperature pair is not suitable, the server 102 is operable to produce a new time-temperature pair. For example, if the time of the time-temperature pair added to the cook begin time or the time at which the cooking parameters were input from the client interface yields a time of day later than the cook finish time, a new time-temperature pair will be needed. In other examples, in order to produce the new time-temperature pair, the server 102 may be operable to adjust the default time-temperature pair in accordance with a food quantity parameter, a food type parameter, a degree of cook parameter, cook begin time parameter and/or cook end time parameter. Additionally, the server 102 may adjust the default time-temperature pair in accordance with the cooking device parameters.

Moreover, the server 102 may be operable to apply an adaptation rule to the default time-temperature pair, in order to produce the new time-temperature pair. For this purpose, the server 102 fetches the adaptation rule from the cooking services database 104. In some examples, the adaptation rule may be influenced by a heat equation approximation for the food type and food quantity parameters to ensure that an inner core of the cooking subject is cooked at a suitable temperature, so as to yield a palatable cooked food that conforms to the degree of cook parameter.

Additionally, the adaptation rule may be influenced by pathogen decay curves to ensure that the cooking process yields a safely cooked food that is free from food-borne pathogens.

Moreover, the server 102 may be operable to assess whether the new time-temperature pair represents an unacceptable deviation from one or more time-temperature pairs known to yield a palatable and safely cooked food. For example, it may be known that the new time-temperature pair will produce an overly tough cook of the cooking subject. For this purpose, the server 102 may fetch the one or more time-temperature pairs from the cooking services database 104.

The server 102 is operable to iteratively execute the producing and assessing actions, while the new time-temperature pair represents an unacceptable deviation from the one or more time-temperature pairs known to yield a palatable and safely cooked food.

When the server 102 fails to establish a new time-temperature pair that is acceptable, the server 102 may be operable to conclude the iterative execution after a number of iterations equal to a predetermined limit number. Additionally, the server 102 may provide a notification to the client interface reflecting a failure to establish an acceptable new time-temperature pair.

Additionally or alternatively, the server 102 may be operable to employ the food type, food quantity and/or degree of cook parameters to select a maximum palatable temperature from the cooking services database 104. Subsequently, the server 102 may determine whether the new time-temperature pair necessitates exceeding the maximum palatable temperature. When the new time-temperature pair necessitates exceeding the maximum palatable temperature, the server 102 may repeat the producing action.

Additionally, the server 102 may be operable to repeat the producing action when the new time-temperature pair is determined to be incapable of yielding a cooked food meeting the degree of cook parameter.

Finally, when the new time-temperature pair is determined to be capable of yielding a cooked food meeting the various cooking parameters, the server 102 is operable to derive the cooking control routine from the new time-temperature pair. Additionally, the server 102 may present the new time-temperature pair to the client interface.

Subsequently, the server 102 may transmit the cooking control routine to the cooking control module 112 of the cooking device 108.

Upon receiving the cooking control routine, the cooking device 108 is operable to perform the cooking process in accordance with the cooking control routine. For this purpose, the cooking control module 112 is arranged to regulate conditions of the cooking chamber, namely, refrigeration and/or cooking and/or circulation conditions of the cooking chamber.

During the cooking process, the cooking control module 112 may activate the cooling module 116 or the heating module 118 of the cooking device 108 to decrease or increase temperature of the cooking chamber in accordance with the cooking control routine. Additionally, the cooking control module 112 is operable to control agitation and/or circulation of a cooking medium filled in the cooking chamber with an air injection module 109 in accordance with the cooking control routine.

Furthermore, the server 102 may be operable to receive cooking feedback from a client interface. The server 102 may then modify the default time-temperature pair in accordance with the cooking feedback, and update the modified default time-temperature pair in the cooking services database 104. Alternatively, the server 102 may store the new time-temperature pair as a separate default time-temperature pair in the cooking services database 104.

In this manner, the cooking system 100 is operable to allow the user to remotely control the cooking device 108 for cooking food, and to provide the user with new time-temperature pairs when default time-temperature pairs are not suitable.

FIG. 1 is merely an example, which should not unduly limit the scope of the claims herein. It is to be understood that the specific designation for the cooking system 100 is provided as an example and is not to be construed as limiting the cooking system 100 to specific numbers, types, or arrangements of servers, cooking services databases, user devices, and cooking devices. A person skilled in the art will recognize many variations, alternatives, and modifications of embodiments of the present disclosure.

In an illustrative example a user inputs food type, food quantity, degree of cook, cook begin and cook finish time parameters and a default time-temperature pair is fetched by the server 102 from the cooking services database 104 which specifies a cooking subject of the type and quantity input by the user be cooked for two hours at 57 degrees Centigrade (57° C.). As such, the cooking process should begin at least two hours before a cook finish time input by the user. When the cook finish time input is only one hour after the cook begin time, the user will require an adjustment to the default time-temperature pair.

The server 102 analyzes the cook begin time and cook finish time parameters and the time of two hours from the default time-temperature pair, to produce a new time-temperature pair when the duration between the cook begin time parameter and the cook finish time parameter does not equal the time of the time-temperature pair, as described earlier. In some cases, a time stamp may be interpreted as the cook begin time parameter. The adaptation rule is applied to the default time-temperature pair in accordance with the duration to ensure that the new time-temperature pair is capable of yielding a palatable and safely cooked food. Accordingly, the new time-temperature pair produced in accordance with the user's cook finish time parameter one hour after the user's cook begin time parameter specifies that the cooking subject be cooked for one hour at 63 degrees Centigrade (63° C.).

Later, the server 102 may receive cooking feedback from the user regarding how well-suited to his or her taste the cooking subject was cooked. The server 102 may then either set the new time-temperature pair as the default time-temperature pair or stores the new time-temperature pair separately in the cooking services database 104 when the cooking feedback is positive. When the cooking feedback is negative, the server 102 may store a note with the new time-temperature pair which reflects the negative feedback.

In the above example, if the user placed the cooking subject inside the cooking chamber at approximately 8 AM, and specified that the cooking process begin at 7 PM and finish at 8 PM, the cooking control module 112 activates the cooling module 116 of the cooking device 108 in accordance with a cooking control routine to cool down the cooking chamber to a desired refrigeration temperature until cooking is scheduled to begin. This enables the cooking device 108 to keep the cooking subject inside the cooking chamber safe for consumption in a manner similar to a conventional refrigerator.

The desired refrigeration temperature may, for example, range from zero degrees Centigrade (0° C.) to seven degrees Centigrade (7° C.) and, more particularly, from two degrees Centigrade (2° C.) to five degrees Centigrade (5° C.). The desired refrigeration temperature may be either system-defined by default or user-defined. The cooking system 100 may allow the user to define the desired refrigeration temperature, for example, via the remote client interface of the user device 106 or the local client interface of the cooking device 108. The cooking services database 104 may store the desired refrigeration temperature for the cooking device 108 as part of the cooking control routine. Additionally or alternatively, the cooking control module 112 stores the desired refrigeration temperature locally as part of the cooking control routine.

Furthermore, the cooking control module 112 regulates the cooling module 116 to maintain the cooking chamber at the desired refrigeration temperature, as per the cooking control routine. The cooking control module 112 deactivates the cooling module 116 and activates the heating module 118 to heat the cooking chamber to a desired cooking temperature at 7 PM, in the present example, depending on the cooking parameters of the cooking device 108.

The cooking control module 112 then regulates the heating module 118 to maintain the cooking chamber at the desired cooking temperature for the desired duration, namely, at 63 degrees Centigrade (63° C.) for one hour. As a result, the cooking process is finished by 8 PM, as the user desired.

Additionally, during cooking, the cooking control module 112 regulates an air injection module 109 to control agitation and/or circulation of a cooking medium filled in the cooking chamber by energizing an air pump to supply air through a one-way valve in fluid communication with the cooking medium. In this manner, cooking control unit 112 controls aeration of the cooking medium.

Figure 2A:
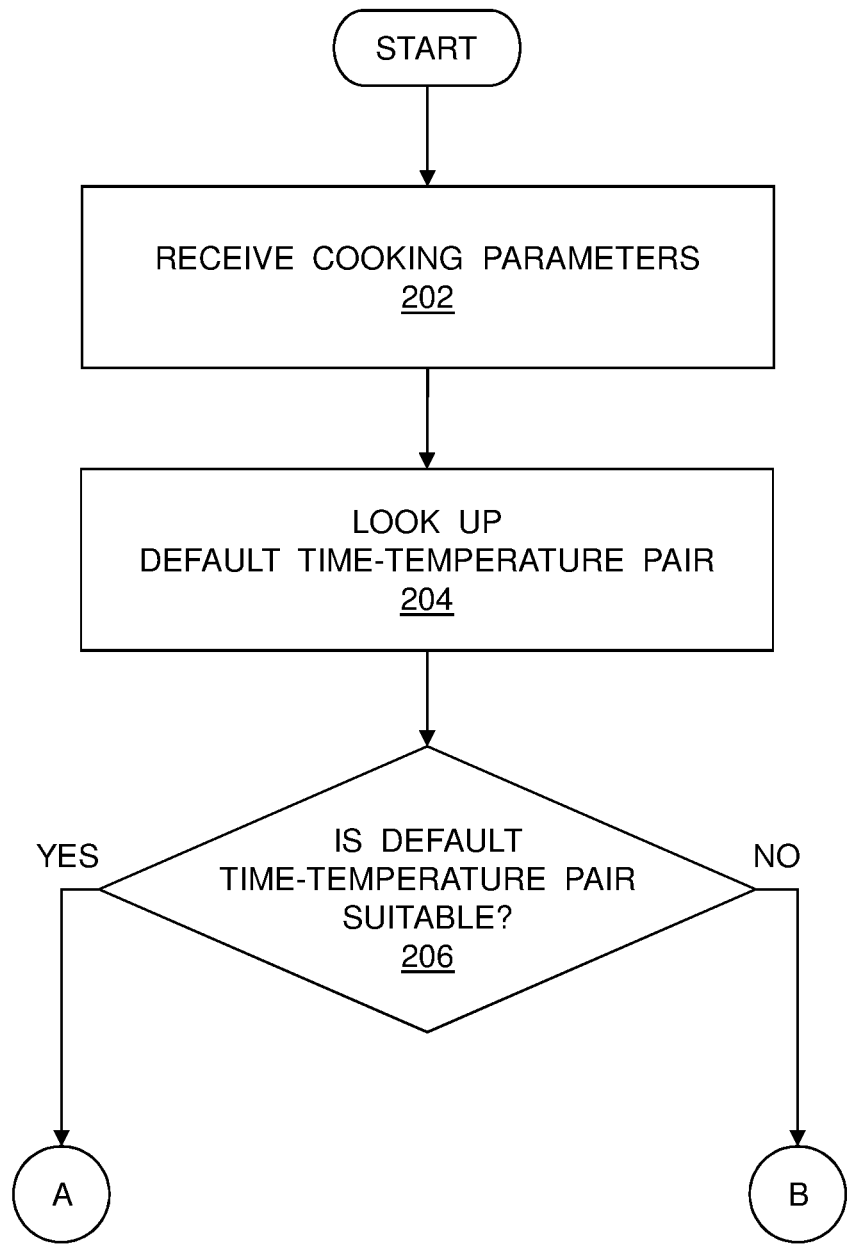
FIGS. 2A, 2B and 2C collectively illustrate example steps of a method for "sous-vide" cooking, in accordance with an embodiment of the present disclosure.
Figure 2B:
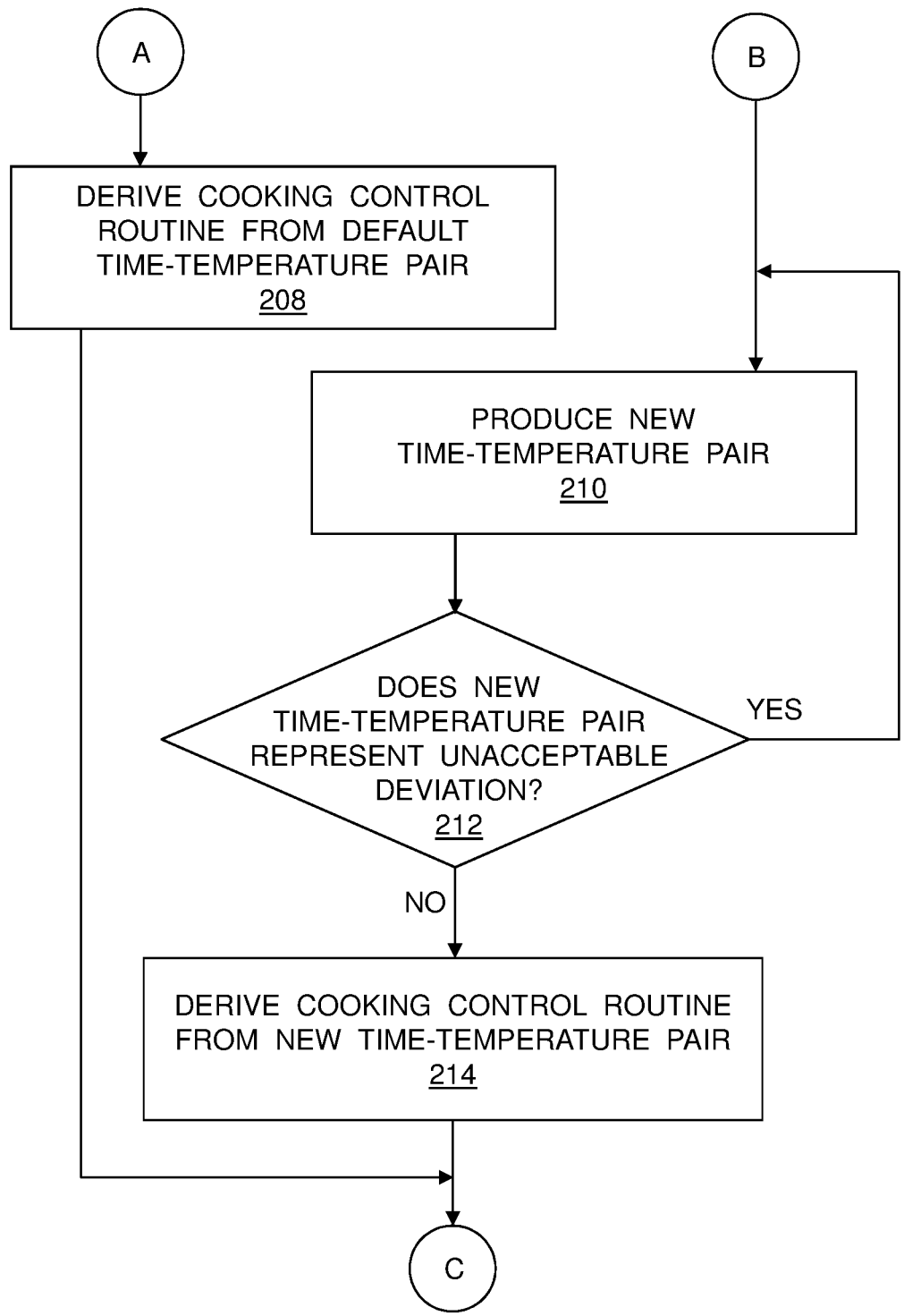
Figure 2C:
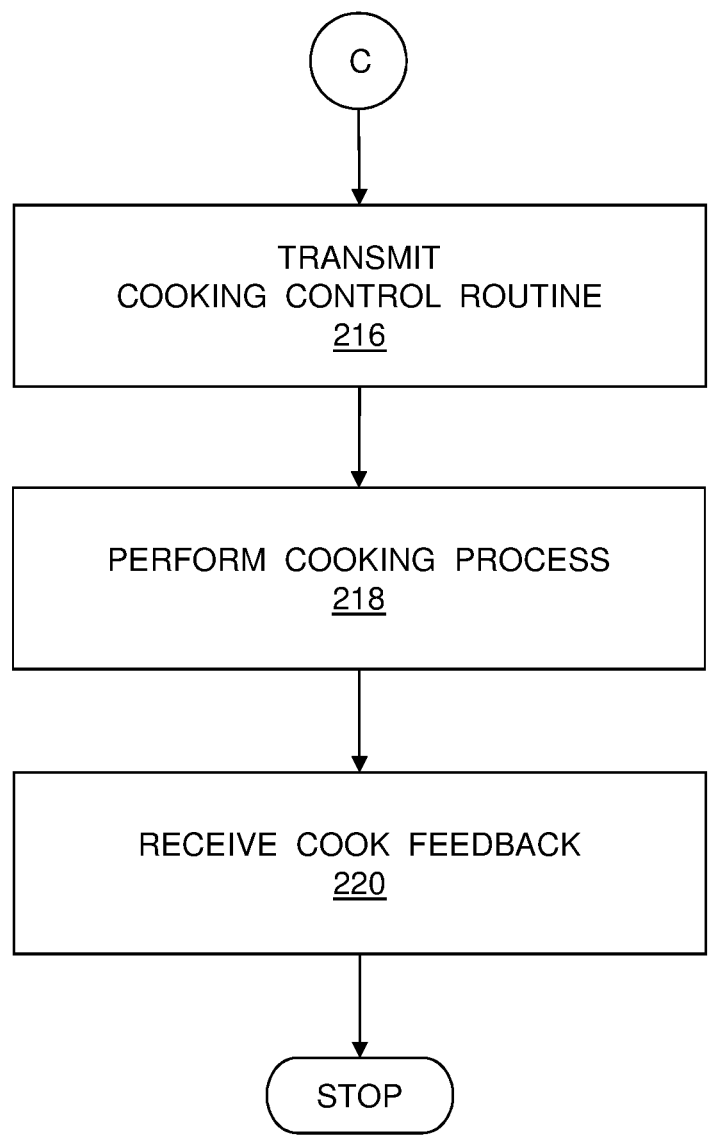

FIGS. 2A, 2B and 2C collectively illustrate steps of a method for "sous-vide" cooking, in accordance with an embodiment of the present disclosure. The method is depicted as a number of actions in a logical flow diagram, which represents an example sequence of actions that can be implemented in hardware, software, or a combination thereof.

By way of example only, the method has been illustrated with reference to the cooking system 100 as described in conjunction with FIG. 1.

In accordance with 202, the server 102 receives various cooking parameters including one or more of: food type, food quantity, degree of cook, cook begin time, and cook finish time parameters. In one example, the server 102 receives one or more of the various cooking parameters from the remote client interface of the user device 106 while, in another example, the server 102 receives one or more of the various cooking parameters from the cooking device 108. For example, the food quantity parameter may be received as measured by the scale 120 of the cooking device 108.

At 204, the server 102 looks up in the cooking services database 104 a default time-temperature pair matching the food type and food quantity parameters.

At 206, the server 102 determines whether the default time-temperature pair is suitable for yielding a cooked food meeting the food type, food quantity parameters within the cook begin time and cook finish time parameters.

If, at 206, it is determined that the default time-temperature pair is suitable, the server 102 derives a cooking control routine from the default time-temperature pair at 208. In one example, the method also includes providing, by the server 102, the default time-temperature pair to a client interface.

If it is determined that the default time-temperature pair is not suitable, the server 102 produces a new time-temperature pair at 210. The server 102 may optionally adjust the default time-temperature pair in accordance with the degree of cook parameter and/or the cooking device parameters.

Moreover, the server 102 may apply the adaptation rule from the cooking services database 104.

Next, at 212, the server 102 assesses whether the new time-temperature pair represents an unacceptable deviation from one or more time-temperature pairs known to yield a palatable and safely cooked food.

If, the new time-temperature pair represents an acceptable deviation, the server 102 derives the cooking control routine from the new time-temperature pair at 214. In one example, the method may include an additional step at which the server 102 provides the new time-temperature pair to the client interface.

If it is assessed that the new time-temperature pair represents an unacceptable deviation, the server 102 produces a new time-temperature pair at 210 again. As such, actions 210 and 212 are executed iteratively.

If the iterative execution of actions 210 and 212 fails to establish an acceptable new time-temperature pair, the iterative execution may be concluded after a number of iterations equal to a predetermined limit number. In one example, the method may include the server 102 providing a notification to the client interface reflecting a failure to establish an acceptable new time-temperature pair.

At 216, the server 102 transmits the cooking control routine to the cooking control module 112 of the cooking device 108 and the cooking device 108 performs a cooking process in accordance with the cooking control routine at 218.

Figure 2D:
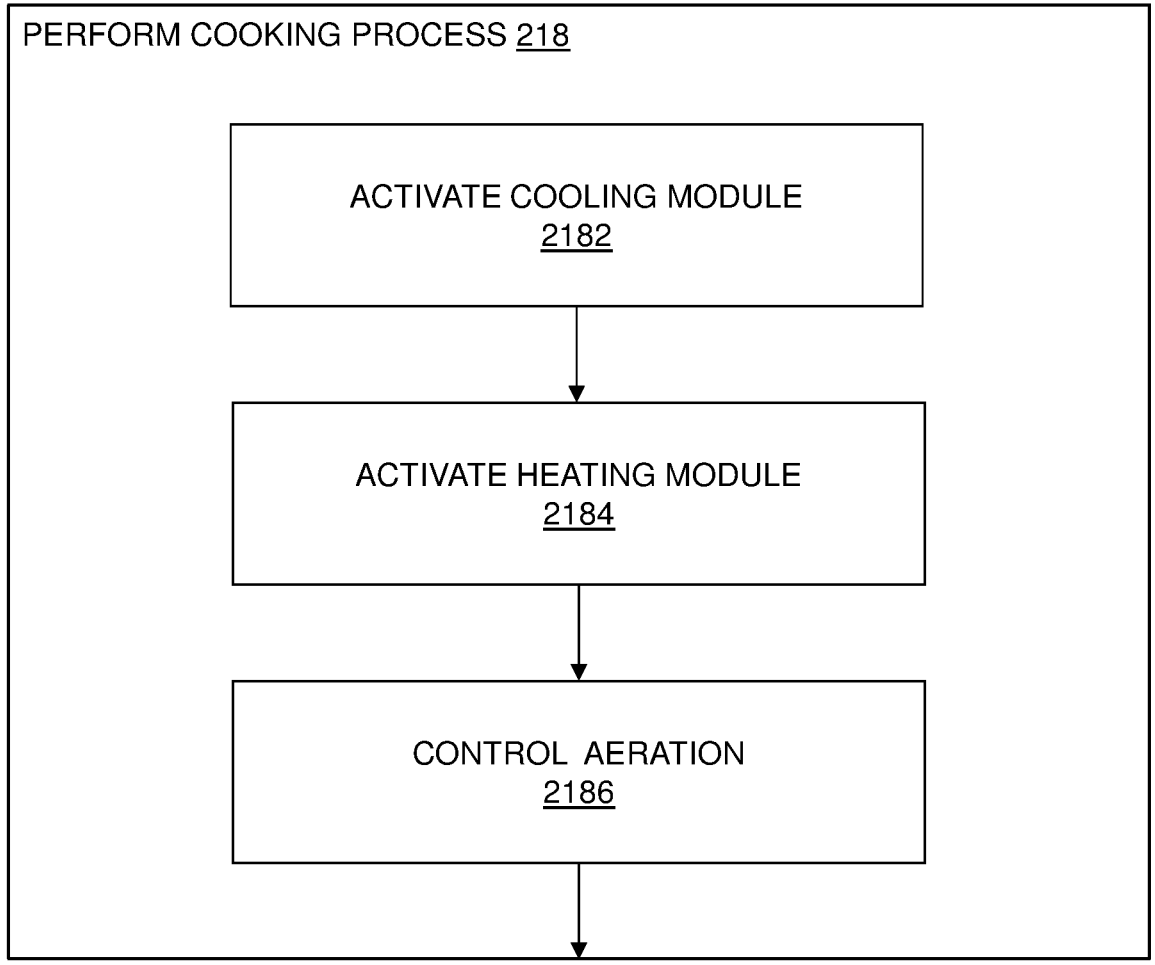
FIG. 2D illustrates example actions of an example performance of a "sous-vide" cooking process, in accordance with an embodiment of the present disclosure.

In order to cool cooking fluid and any cooking subject submerged or partially submerged in the cooking fluid, a cooking process 218 may include activating a cooling module of the cooking device as action 2182 (FIG. 2D) in accordance with the cooking control routine. Furthermore, a cooking process performed at 218 may also include activating a heating module of the cooking device as action 2184 in accordance with the cooking control routine in order to heat cooking fluid and any cooking subject submerged therein.

In an example, the cooking process may include alternately activating a cooling module of the cooking device and activating a heating module of the cooking device in order to adjust temperature of a cooking medium held by the cooking chamber.

Activating a cooling module of the cooking device may be performed by controlling heat flux through the cooling module to a heat sink.

In order to control agitation and/or circulation of a cooking medium held by a cooking chamber of the cooking device, a cooking process 218 further includes employing the cooking control module to control aeration of the cooking medium as action 2186 in accordance with the cooking control routine. Controlling aeration of the cooking medium may be managed by controlling an amount of air injected into the cooking medium. For example, the cooking control module may energize an air pump to supply air through a one-way valve in fluid communication with a cooking medium held by the cooking chamber.

At 220, (FIG. 2C) the server 102 receives cooking feedback from the client interface.

In an example, the method may include an additional action during which the server 102 modifies the default time-temperature pair in accordance with the cooking feedback, and updates in the cooking services database 104. Alternatively, the method may include an additional action during which the server 102 stores the new time-temperature pair as another default time-temperature pair separately in the cooking services database 104.

Actions 202 to 220 are only illustrative and other alternatives can also be provided where one or more actions are added, one or more actions are removed, or one or more actions are provided in a different sequence without departing from the scope of the claims herein.

Embodiments of the present disclosure provide a program product recorded on non-transient machine-readable data storage media, wherein the program product is executable upon computing hardware for implementing the method as described in conjunction with FIGS. 2A-C on the cooking system 100.

Figure 3A:
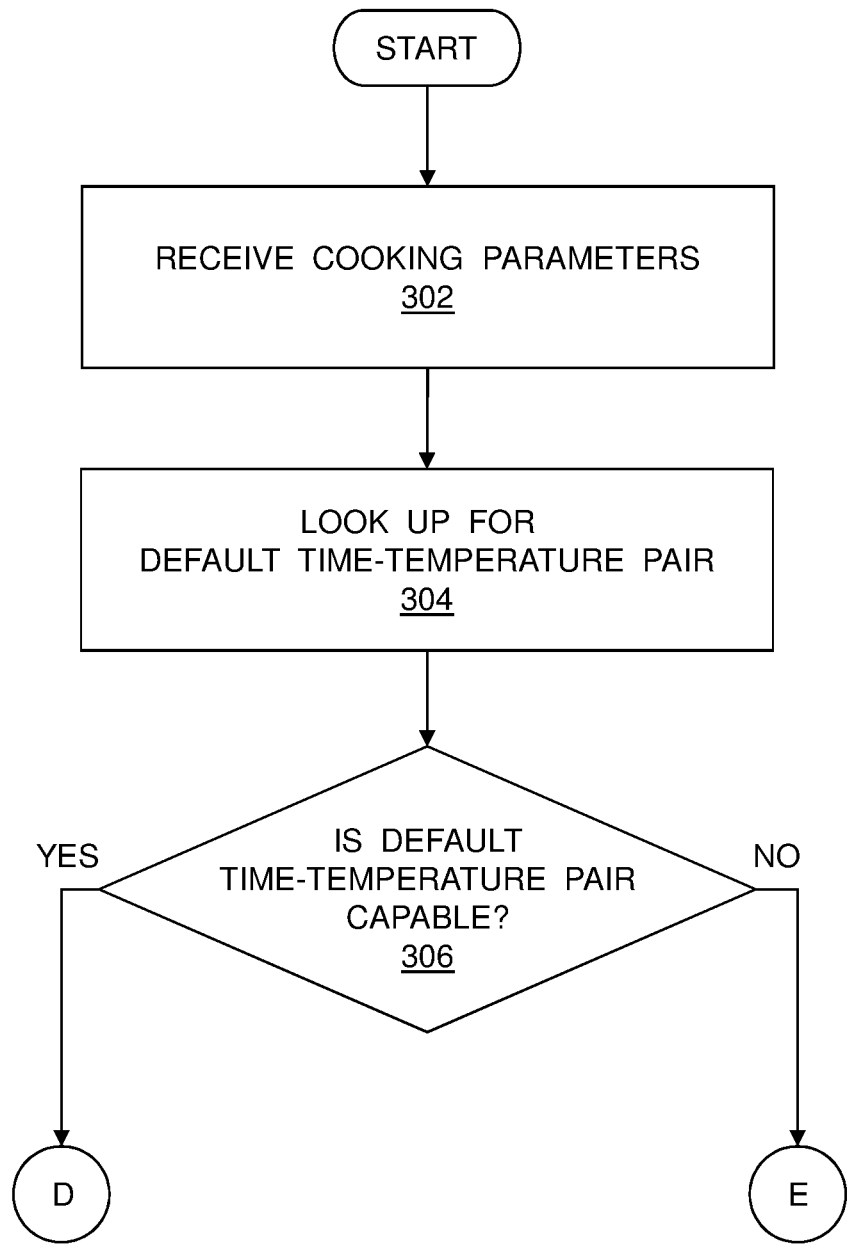
FIGS. 3A, 3B and 3C collectively illustrate example steps of a method for food treatment, in accordance with an embodiment of the present disclosure.
Figure 3B:
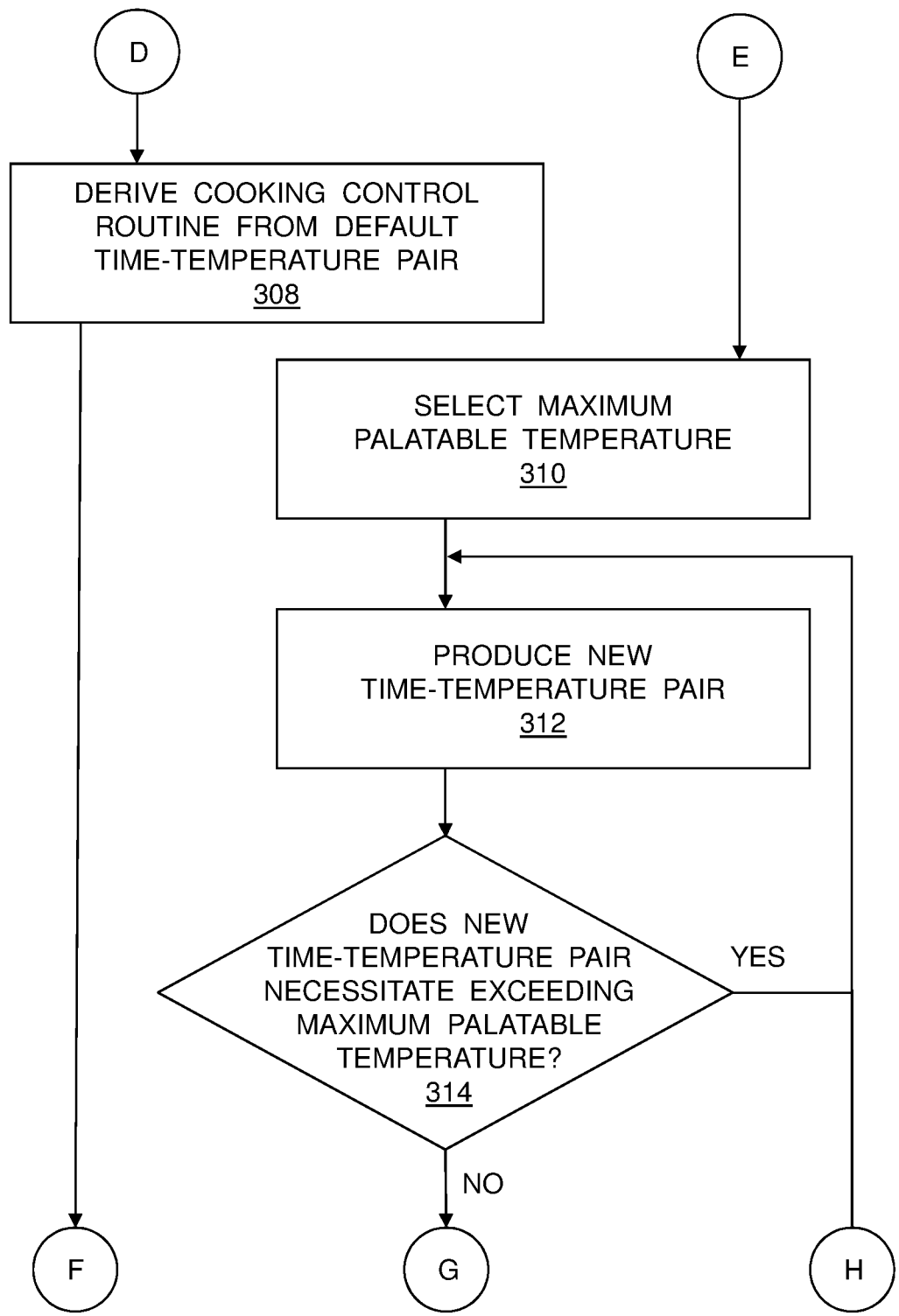
Figure 3C:
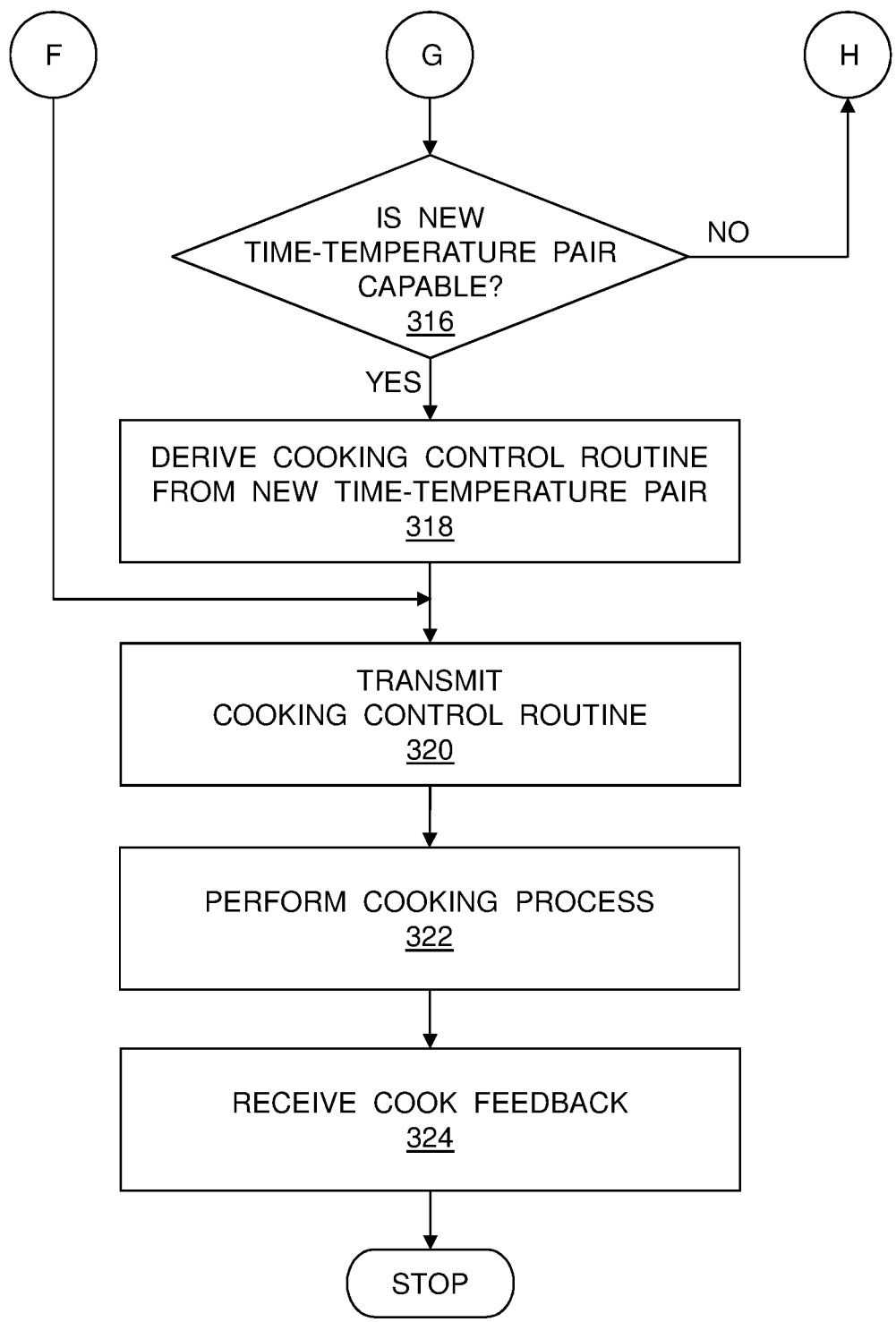

FIGS. 3A, 3B and 3C collectively illustrate steps of a method for food treatment, in accordance with an embodiment of the present disclosure. The method is depicted as a collection of steps in a logical flow diagram, which represents a sequence of steps that can be implemented in hardware, software, or a combination thereof.

By way of example only, the method has been illustrated with reference to the cooking system 100 as described in conjunction with FIG. 1.

At 302, the server 102 receives various cooking parameters including one or more of: food type, food quantity, degree of cook, cook begin time, and cook finish time parameters. The server 102 may receive one or more of the various cooking parameters from the remote client interface of the user device 106.

At 304, the server 102 employs the food type and food quantity parameters to look up a default time-temperature in the cooking services database 104.

At 306, the server 102 determines whether the default time-temperature pair is capable of yielding a cooked food meeting the food type, food quantity, cook begin time and cook finish time parameters.

If it is determined that the default time-temperature pair is capable of yielding a cooked food complying with the received parameters, the server 102 derives a cooking control routine from the default time-temperature pair at 308. Otherwise, if it is determined that the default time-temperature pair is incapable, the server 102 employs the food type and food quantity parameters to select a maximum palatable temperature from the cooking services database 104 at step 310.

At 312, the server 102 produces a new time-temperature pair. For example, the server 102 may adjust the default time-temperature pair in accordance with the food quantity parameter and/or the cooking device parameters.

Moreover, the server 102 may apply the adaptation rule from the cooking services database 104 during production of the new time-temperature pair.

At 314, the server 102 determines whether the new time-temperature pair necessitates exceeding the maximum palatable temperature.

If it is determined that the new time-temperature pair necessitates exceeding the maximum palatable temperature, production of the new time-temperature pair is repeated.

Otherwise, if it is determined that the new time-temperature pair does not necessitate exceeding the maximum palatable temperature, at 316 the server 102 determines whether the new time-temperature pair is capable of yielding a cooked food meeting the degree of cook parameter.

If it is determined that the new time-temperature pair is not capable of yielding a cooked food meeting the degree of cook parameter, production of the new time-temperature pair is repeated at 312.

Otherwise, if it is determined that the new time-temperature pair is capable of yielding a cooked food meeting the degree of cook parameter, the server 102 derives the cooking control routine from the new time-temperature pair at 318.

At 320, the server 102 transmits the cooking control routine to the cooking control module 112 of the cooking device 108.

At 322, the cooking device 108 performs a cooking process in accordance with the cooking control routine. Similar to the above mentioned cooking process described in conjunction with FIGS. 2A, 2B, and 2C, a cooking process 322 includes but may not be limited to activating a cooling module of the cooking device in order to cool a cooking medium such as a cooking fluid, activating a heating module of the cooking device in order to heat cooking fluid and controlling agitation and/or circulation of a cooking medium held by a cooking chamber of the cooking device in accordance with the cooking control routine.

At 324, the server 102 receives cooking feedback from the client interface.

In an example, the method may include modification, by the server 102, of the default time-temperature pair in accordance with cooking feedback, and a corresponding update in the cooking services database 104. Alternatively, the method may additionally include storing, by the server 102, the new time-temperature pair as another default time-temperature pair separately in the cooking services database 104.

Actions 302 to 324 are only illustrative and other alternatives can also be provided where one or more actions are added, one or more actions are removed, or one or more actions are provided in a different sequence without departing from the scope of the claims herein.

Embodiments of the present disclosure provide a program product recorded on non-transient machine-readable data storage media, wherein the program product is executable upon computing hardware for implementing the method as described in conjunction with FIGS. 3A-C on the cooking system 100.

Embodiments of the present disclosure are susceptible to being used for various purposes, including, though not limited to, facilitating personalization of a time-temperature pair for easy and safe "sous-vide" cooking of food.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for sous-vide cooking, comprising:
receiving, from a remote client interface, a food type parameter, a food quantity parameter, a degree of cook parameter, a cook begin time parameter, and a cook finish time parameter for a cooking subject;
employing the food type parameter and the food quantity parameter to look up, in a cooking services database, a default time-temperature pair;
determining a cook duration from the cook begin time parameter and the cook finish time parameter;
comparing the time of the default time-temperature pair to the cook duration;
producing a new time-temperature pair when the time of the default time-temperature pair does not equal the cook duration;
deriving a cooking control routine from the new time-temperature pair;
transmitting the cooking control routine to a cooking control module of a cooking device;
with the cooking control module, performing a cooking process on the cooking subject in accordance with the cooking control routine; and
in accordance with the cooking control routine, employing the cooking control module to energize an air pump to supply air through a one-way valve in fluid communication with a cooking medium held by a cooking chamber of the cooking device and control an amount of air injected into the cooking medium.

2. The method as set forth in claim 1, further comprising repeating the producing when, according to the cooking services database, the new time-temperature pair is not capable of yielding, from the cooking subject, a cooked food meeting the degree of cook parameter.

3. The method as set forth in claim 1, further comprising adjusting the default time-temperature pair in accordance with parameters of the cooking device.

4. The method as set forth in claim 1, wherein the producing the new time-temperature pair further comprises applying an adaptation rule from the cooking services database to the default time-temperature pair using the cook duration.

5. The method as set forth in claim 1, further comprising presenting the new time-temperature pair to the remote client interface.

6. The method as set forth in claim 1, further comprising:
receiving cooking feedback from the remote client interface regarding the cooking subject as cooked by the performed cooking process;
modifying the default time-temperature pair in accordance with the cooking feedback; and
storing the modified default time-temperature pair for use as a new default time-temperature pair.

7. A method for sous-vide cooking, comprising:
receiving, from a remote client interface, a food type parameter, a food quantity parameter, a degree of cook parameter, a cook begin time parameter, and a cook finish time parameter for a cooking subject;
employing the food type parameter and the food quantity parameter to look up, in a cooking services database, a default time-temperature pair;
determining a cook duration from the cook begin time parameter and the cook finish time parameter;
comparing the time of the default time-temperature pair to the cook duration;
producing a new time-temperature pair when the time of the default time-temperature pair does not equal the cook duration;
deriving a cooking control routine from the new time-temperature pair;
transmitting the cooking control routine to a cooking control module of a cooking device;
with the cooking control module, performing a cooking process on the cooking subject in accordance with the cooking control routine; and
employing the cooking control module to energize an air pump to control aeration of a cooking medium in accordance with the cooking control routine.

8. The method as set forth in claim 7, further comprising:
employing the food type parameter, the food quantity parameter and the degree of cook parameter to select a maximum palatable temperature from the cooking services database; and
repeating the producing when the new time-temperature pair necessitates exceeding the maximum palatable temperature.

9. The method as set forth in claim 7, further comprising repeating the producing when, according to the cooking services database, the new time-temperature pair is not capable of yielding, from the cooking subject, a cooked food meeting the degree of cook parameter.

10. The method as set forth in claim 7, further comprising adjusting the default time-temperature pair in accordance with parameters of the cooking device.

11. The method as set forth in claim 7, wherein the producing the new time-temperature pair further comprises applying an adaptation rule from the cooking services database to the default time-temperature pair using the cook duration.

12. The method as set forth in claim 7, further comprising presenting the new time-temperature pair to the remote client interface.

13. The method as set forth in claim 7, further comprising:
receiving cooking feedback from the remote client interface regarding the cooking subject as cooked by the performed cooking process;
modifying the default time-temperature pair in accordance with the cooking feedback; and
storing the modified default time-temperature pair for use as a new default time-temperature pair.

14. A method for sous-vide cooking, comprising:
in response to detecting changes in mass and/or force by a plurality of load cells, with a cooking control module of a cooking device, recording the changes in mass and/or force as a food quantity parameter and sending a prompt for a cook begin time parameter to a remote client interface;
receiving, from the remote client interface, the cook begin time parameter, a food type parameter, a degree of cook parameter, and a cook finish time parameter;
employing the food type parameter and the food quantity parameter to look up, in a cooking services database, a default time-temperature pair correlated to the food type and food quantity parameters;
producing a new time-temperature pair when the default time-temperature pair is not capable of yielding a cooked food meeting the food type parameter, the food quantity parameter, the cook begin time parameter and the cook finish time parameter;
deriving a cooking control routine from the new time-temperature pair;
transmitting the cooking control routine to the cooking control module; and
performing a sous-vide cooking process on a food subject placed in a flexible vessel in accordance with the cooking control routine.

15. The method as set forth in claim 14, further comprising:
employing the food type parameter and the food quantity parameter to select a maximum palatable temperature from the cooking services database; and
repeating the producing action when the new time-temperature pair necessitates exceeding the maximum palatable temperature.

16. The method as set forth in claim 14, further comprising repeating the producing action when the new time-temperature pair is not capable of yielding, form the cooking subject, a cooked food meeting the degree of cook parameter.

17. The method as set forth in claim 14, further comprising adjusting the default time-temperature pair in accordance with parameters of the cooking device.

18. The method as set forth in claim 14, wherein the producing the new time-temperature pair further comprises applying an adaptation rule from the cooking services database.

19. The method as set forth in claim 14, further comprising:
receiving cooking feedback from the remote client interface; and
modifying the default time-temperature pair in accordance with the cooking feedback.

20. The method as set forth in claim 14, further comprising providing the new time-temperature pair to the remote client interface.

* * * * *